United States Patent
Lundsgaard et al.

(10) Patent No.: US 8,249,242 B2
(45) Date of Patent: Aug. 21, 2012

(54) SECURE CALL DTMF SIGNALING

(75) Inventors: Soren K. Lundsgaard, Inverness, IL (US); Douglas A. Kuhlman, Inverness, IL (US); Yi-Cheng Liu, Barrington, IL (US); Edgardo L. Promenzio, Ingleside, IL (US); Jorge R. Lopez Danieluk, Cordoba (AR)

(73) Assignee: Symbol Technologies, Inc., Holtsville, NY (US)

(*) Notice: Subject to any disclaimer, the term of this patent is extended or adjusted under 35 U.S.C. 154(b) by 118 days.

(21) Appl. No.: 12/878,153

(22) Filed: Sep. 9, 2010

(65) Prior Publication Data

US 2012/0063586 A1 Mar. 15, 2012

(51) Int. Cl.
*H04M 7/00* (2006.01)
*H04M 19/02* (2006.01)

(52) U.S. Cl. ........ 379/235; 379/229; 379/230; 379/283; 379/361

(58) Field of Classification Search .............. 379/229, 379/230, 235, 282, 283, 360, 361
See application file for complete search history.

(56) References Cited

U.S. PATENT DOCUMENTS

| | | | |
|---|---|---|---|
| 6,144,848 A | 11/2000 | Walsh et al. | |
| 6,400,821 B1 * | 6/2002 | Burgan et al. | 379/361 |
| 6,771,751 B1 * | 8/2004 | Kasturi et al. | 379/93.27 |
| 2002/0186833 A1 * | 12/2002 | Lucas | 379/361 |
| 2008/0279364 A1 * | 11/2008 | Kaji et al. | 379/283 |

* cited by examiner

*Primary Examiner* — Harry Hong
(74) *Attorney, Agent, or Firm* — Brian M. Mancini (57) ABSTRACT

A method and system for secure call Dual-Tone Multi-Frequency (DTMF) signaling includes entering (202) dial string of a telephone number of a destination device, assigning (210, 212) the dial string to a predefined string having a total length that is greater than the dial string such that there will be at least one leading hexadecimal bit in the predefined string length that is not used when the entered dial string is converted to a hexadecimal, converting (214) the dial string to hexadecimal, reversing the order of the hexadecimal, and placing the reversed hexadecimal at the beginning of the predefined string, appending (216) "one" bits to the predefined string length indicating how many nibbles of the predefined string length are unused, if any, and appending the remaining intervening unused bits in the predefined string length to "zero" bits, and sending (226) the encoded string length.

21 Claims, 3 Drawing Sheets

SECURE CALL DTMF SIGNALING

FIELD OF THE DISCLOSURE

The present invention relates generally to telephone number call signaling between communication networks and more particularly to secure call Dual-Tone Multi-Frequency (DTMF) signaling.

BACKGROUND

Communication systems currently exist to allow a call to be interconnected between different communication networks. For example, a call can be originated in a cellular network for a destination in a wireline network. These calls can be dialed and interconnected through a gateway telephony device, such as Private Branch Exchange (PBX) server, for example. Typically, such interconnection includes an originating cellular device sending the digits for a destination device telephone number in a Dual-Tone Multi-Frequency (DTMF) format in digitized audio packets to the gateway device. The gateway provides the connection between the wireless and wireline networks, and thereafter allows the originating device and destination device to perform the call negotiation.

A problem arises in non-3 G communication systems in that there is no data connection along with the audio connection. Therefore, the gateway only receives the audio packets, and is unable to separately authenticate the originating device. As a result, an unauthorized device could contact the gateway with dial tones for an unauthorized destination device and obtain service illegitimately.

Another problem arises when DTMF tones are digitized and sent with different codecs. Some of the available lower bandwidth or higher compression codecs could distort the audio tones to such an extent that they may no longer be recognized as DTMF tones. Still another problem occurs when portions of the originating call are dropped. For example, the gateway, may receive a telephone number with missing or incorrect digits. In this case, the gateway may not be able to complete the call, or could even call the wrong telephone number.

Accordingly, there is a need for a technique to lower the probability that an unauthorized or erroneous call can occur between communication networks.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus and method provides a technique to lower the probability that an unauthorized or erroneous call can occur in a communication network. In particular, the present invention introduces a DTMF encoding/decoding technique to alleviate the above problems. In particular, the present invention pads bits to a dial string in a particular manner, as will be detailed below. In addition, the present invention can add a Cyclic Redundancy Check (CRC) and encryption to the DTMF tones.

Figure 1:
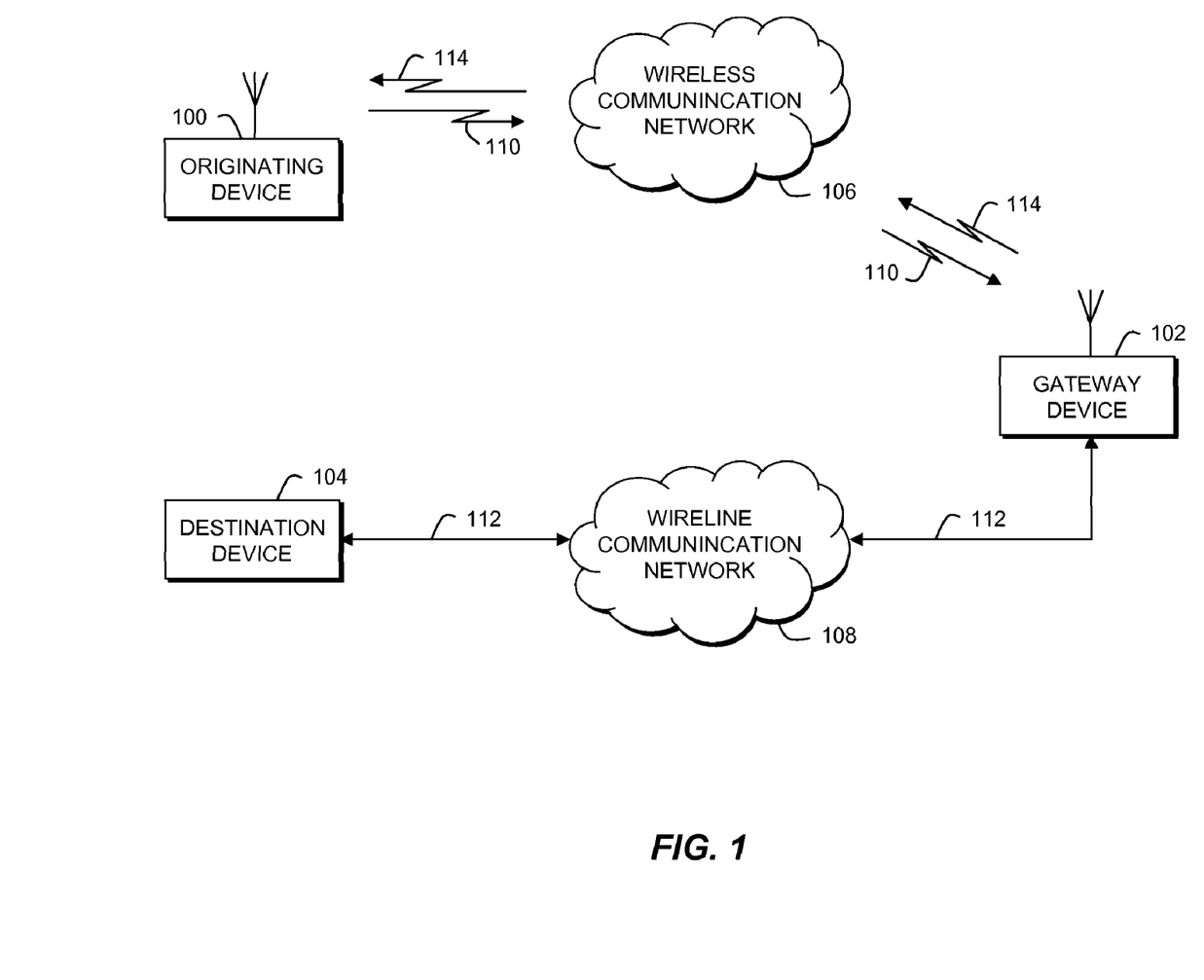
FIG. 1 is a simplified block diagram of a system, in accordance with some embodiments of the present invention.

FIG. 1 is a block diagram depiction of a system in accordance with the present invention. A plurality of network entities are shown, which can support a wireless communication network 106, such as a non-3G cellular communications network, for example, and a wireline communication network 108, such as a public switched telephone network (PSTN). The network entities can include an originating wireless communication device 100, such as a cellular radiotelephone or mobile device operable in a WLAN environment, and a destination device 104, such as a standard landline telephone. A telephony device or gateway 102, such as a PBX gateway couples communications between the wireless and wireline network 106, 108. The operating characteristics of the communication networks 106, 108 are known in the art and will not be presented here for the sake of brevity.

The wireless communication network 106 can include local and wide-area networks, or other non 3G cellular wireless communication systems. However, it should be recognized that the present invention is also applicable to other wireless communication systems modified to implement embodiments of the present invention.

Referring back to FIG. 1, there is shown a block diagram of various entities adapted to support the inventive concepts of the embodiments of the present invention. Those skilled in the art will recognize that FIG. 1 does not depict all of the equipment necessary for the networks to operate but only those network components and logical entities particularly relevant to the description of embodiments herein. For example, cellular radio telephones, mobile devices, telephones, and telephony devices can all includes separate processors, communication interfaces, transceivers, memories, etc. In general, components such as processors, memories, and interfaces are well-known. For example, processing units are known to comprise basic components such as, but not limited to, microprocessors, microcontrollers, memory cache, application-specific integrated circuits (ASICs), and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components. It is within the contemplation of the invention that the operating requirements of the present invention can be implemented in software, firmware or hardware, with the function being implemented in a software processor (or a digital signal processor) being merely an option.

Referring back to FIG. 1, the originating device 100 receives instructions from a user to dial a specific telephone number of a destination device 104. In particular, the originating device 100 first contacts the gateway device 102 to set up a call. DTMF tones are used to send information from the originating device 100 to a gateway 102 during call initiation. In particular, upon contact with the gateway 102, the originating device 100 transmits a dial string of DTMF tones 110, encoded in accordance with the present invention, to the gateway 102. The gateway 102 decodes the DTMF tones in accordance with the present invention, and dials the desired number to the destination device 104 through the wireline network 108. Upon a completed connection the gateway 102 connects the audio streams 112, 114 between the destination device 104 and the originating device 100.

The present invention can transmit dial strings from one to fifteen digits via DTMF, where the digits are the characters 0 though 9. There is an implied "+" for certain international dial strings. According to international telephony protocols dial strings can be no longer then fifteen digits. The present invention encodes the DTMF characters into a hexadecimal format using four-bit nibbles. The present invention also uses four-bit nibbles for the messaging including the DTMF encoded characters, including the command and length information of the message, the dial string itself, and any end padding. The present invention also adds CRC bits and allows for encoding of the messaging. To determine the number of digits that can be encoded using base-sixteen symbols a calculation of $10^N$ can be done to determine a length of that string. Table 1 shows the initial encoding of DTMF characters into hexadecimal format and the length of the hexadecimal string per the number of encoded DTMF characters.

TABLE 1

Length of hexidecimal encoded DTMF characters

| # of digits | hex encoding of $10^N$ | length of hex encoding |
|---|---|---|
| 1 | A | 1 |
| 2 | 64 | 2 |
| 3 | 3E8 | 3 |
| 4 | 2710 | 4 |
| 5 | 186A0 | 5 |
| 6 | F4240 | 5 |
| 7 | 989680 | 6 |
| 8 | 5F5E100 | 7 |
| 9 | 3B9ACA00 | 8 |
| 10 | 2540BE400 | 9 |
| 11 | 174876E800 | 10 |
| 12 | E8D4A51000 | 10 |
| 13 | 9184E72A000 | 11 |
| 14 | 5AF3107A4000 | 12 |
| 15 | 38D7EA4C68000 | 13 |

The middle column of Table 1 shows the base-sixteen encoding of $10^N$ where N is the number of DTMF characters in the first column. The last column shows the number of base-sixteen symbols used to express this number. Since every N digit number will be less than $10^N$, this table gives us the minimum needed encoding for each N digit phone number. In this table, it should be noted converting decimals to hexidecimals in a nibble (4-bit) format leaves unused bits For example, in the row for five digits (or eleven digits), it can be seen that the largest hex number that encodes a five digit phone numbers begins with "1", or 0001. This means that the leading three bits will always be zero in the nibble that encodes the first of these five digits. The present invention utilizes these unused bits to add additional error checking to the decoding procedures to reduce the likelihood of an incorrect string being presented as a dialing string, as will be detailed below. Other rows may not have all these unused bits. For example, in the row for one digit, the largest hex number to encode this digit is "A", or 1010 which does not have an unused leading bit.

Due to the variation in the length of a dialed telephone number using different systems, the present invention has selected four different predefined string lengths that any given dial string of telephone numbers can be assigned within; e.g. five, eight, eleven, or fifteen dialed digits. It should be recognized that different lengths or numbers of grouping could be used. However, the chosen predefined string length should result in a total length that is greater than the length of the entered dial string so that there will be at least one leading hexadecimal bit that is not used. For any of the predefined lengths, since the largest number ($10^N-1$) that will fit into this number of bits is smaller than the allocated length, even at the break points, there will be additional unused leading bits. The present invention utilizes these unused bits to improve the encoding by requiring that the dial string be appended with a sequence of "zero" bits followed by a sequence of "one" bits. In particular, the sequence of "one" bits appended to the dial string determines to what extent the entered dial string is shorter than the maximum allowed, and the "zero" bits provide additional testing for validity of the string, even though the length of the dial string is known. The examples below will show how these two fields are used. Table 2 shows how encoding is split up into four different predefined lengths:

TABLE 2

Encoding into four different dial string lengths

| digits | length before adding CRC | # of appended binary 1 bits | # of appended binary 0 bits |
|---|---|---|---|
| 1 | 6 | 4 | 12 |
| 2 | 6 | 3 | 10 |
| 3 | 6 | 2 | 8 |
| 4 | 6 | 1 | 5 |
| 5 | 6 | 0 | 3 |
| 6 | 8 | 2 | 6 |
| 7 | 8 | 1 | 3 |
| 8 | 8 | 0 | 1 |
| 9 | 11 | 2 | 8 |
| 10 | 11 | 1 | 5 |
| 11 | 11 | 0 | 3 |
| 12 | 14 | 3 | 9 |
| 13 | 14 | 2 | 6 |
| 14 | 14 | 1 | 4 |
| 15 | 14 | 0 | 2 |

In each of the above examples, a header for the encoding is added that uses four bits (i.e. one nibble). The header consists of two bits which define the "instruction type" and two more bits that define the length of the string. In this example, the instruction type is always set for the binary value "01", but it should be recognized that other types could be accommodated. The two length bits can define the four different available lengths. In particular, the binary value "00" defines a predefined length of five digits, "01" for eight digits, "10" for eleven digits, and "11" for fifteen dialed digits. If any number is dialed with a "+" at the beginning, it must use the longest, fifteen digit string, even though less than fifteen digits may be needed. For example, in the United States, after the "+" sign, all phone numbers are eleven digits ("1" is the country code, and all phone numbers are then ten digits after that).

The number of digits to be dialed determines what predefined length grouping it will fall under. For example, in Table 2 if there is only a one digit phone number to dial for example, this would fit into the grouping having a length of five dialed digits (or twenty bits), and have a header of "0100" for a total of length of twenty-four bits, which is the equivalent of six, four-bit digits before adding any CRC bits.

In this scenario, the single digit of the first row is encoded as a four-bit hexadecimal, which along with the four-bit header gives a total of two nibbles (eight bits). This leaves a total of sixteen unused bits (i.e. four nibbles) out of the total length of six digits. Since the single digit phone number takes up only one out of the possible five digit length, there are four nibbles that are unused. The present invention indicates this length of unused bits within the unused bits themselves by setting four of the last unused bits as "one" and the remaining intervening unused bits as "zero".

As explained above for Table 1, a hexadecimal representation for a leading digit of a dialed string can have unused bits (e.g. three bits for a five digit or eleven digit dialed string). Because these unused bits always come at the beginning of the string of digits, the present invention encodes the dialed digits in reverse order. This means that the first encoded hex digit will now be the lowest-valued hex digit, at the end of the string of dialed digits. By having any unused bits at the end of the string, these unused bits and any appended bits can be used together at the termination of the string, together with the addition of CRC bits.

CRC bits can be added to the encoded string to provide a measure of protection against receiving a wrong telephone number. In a preferred embodiment, the polynomial used to calculate CRC for the present invention is $x^8+x^5+x^3+x^2+x+1$. This generates an eight-bit remainder (two hex symbols) which is appended to the strings above. Upon reception, the CRC of the string with the computed CRC appended shall result in a remainder of zero if no detectable corruption has occurred. A non-zero CRC of the received string is an indication of some corruption. Those with normal skill in the art will recognize that other CRCs can be used without changing the fundamental basis of the invention.

The present invention also envisions that encryption can be used to further alleviate errors or unauthorized used. In particular, an encryption seed can be previously shared between the gateway and the originating device over a secure channel. The originating device will use an encryption algorithm (e.g. AES-CTR as is known in the art) and a serial number to create a 128-bit block of data to be XOR'ed with the data string above. Only the first N bits of the XOR'ed data will be used to generate the DTMF to be sent out. The AES-CTR algorithm uses block encryption to generate blocks of data. The use of a counter enables the originating device to have some failed transactions with the gateway but still be able to make calls. For example, if calls 1, 2 and 3 from the originating device are successfully sent, but call 4 is not, the gateway will successfully decode calls 1, 2 and 3 but will never know that it missed call 4, which it never received. As a result the next call from the originating device will be encrypted with AES-CTR block 5. The gateway will attempt to decrypt this call with AES-CTR block 4, which is next on its counter. In this case, there is an extremely high probability that the check will fail validity. However, the gateway can then increment the block counter and decrypt the same call with AES-CTR block 5, where, absent any transmission errors the validity check will succeed and the gateway will be able to dial the call. Those with normal skill in the art will recognize that other encryption techniques can be used without changing the fundamental basis of the invention.

In an alternative embodiment, a different command header can be used with no appended bits. In this embodiment, a variable number, n, of DTMF tones can be sent from the originating device. Each symbol represents a DTMF tone encoded as a single hexadecimal digit, and is sent from the originating device with a command header. The command header is able to encode up to sixteen call commands providing the validation bits for each symbol. Symbols $D_1$ to $D_n$ are the hexadecimal representations of the dial string, where n can be up to fifteen symbols as before. Messages are enclosed in an iteration loop from 1 to n until all the symbols are transmitted, where the command header of the last symbol indicating that the last symbol has been sent. This embodiment can use appended CRC bits as described previously.

In an alternative embodiment, instead of using sixteen tones of DTMF encoding, only twelve DTMF tones are available. In this case, when encoding the dial string, the sequence of base sixteen numbers are converted to base twelve numbers by long division, with the least significant digits appearing first (left to right). When decoding the received DTMF tones, the base twelve numbers are multiplied together to form the base sixteen sequence of numbers, and the decoding process continues as described herein.

Figure 2:
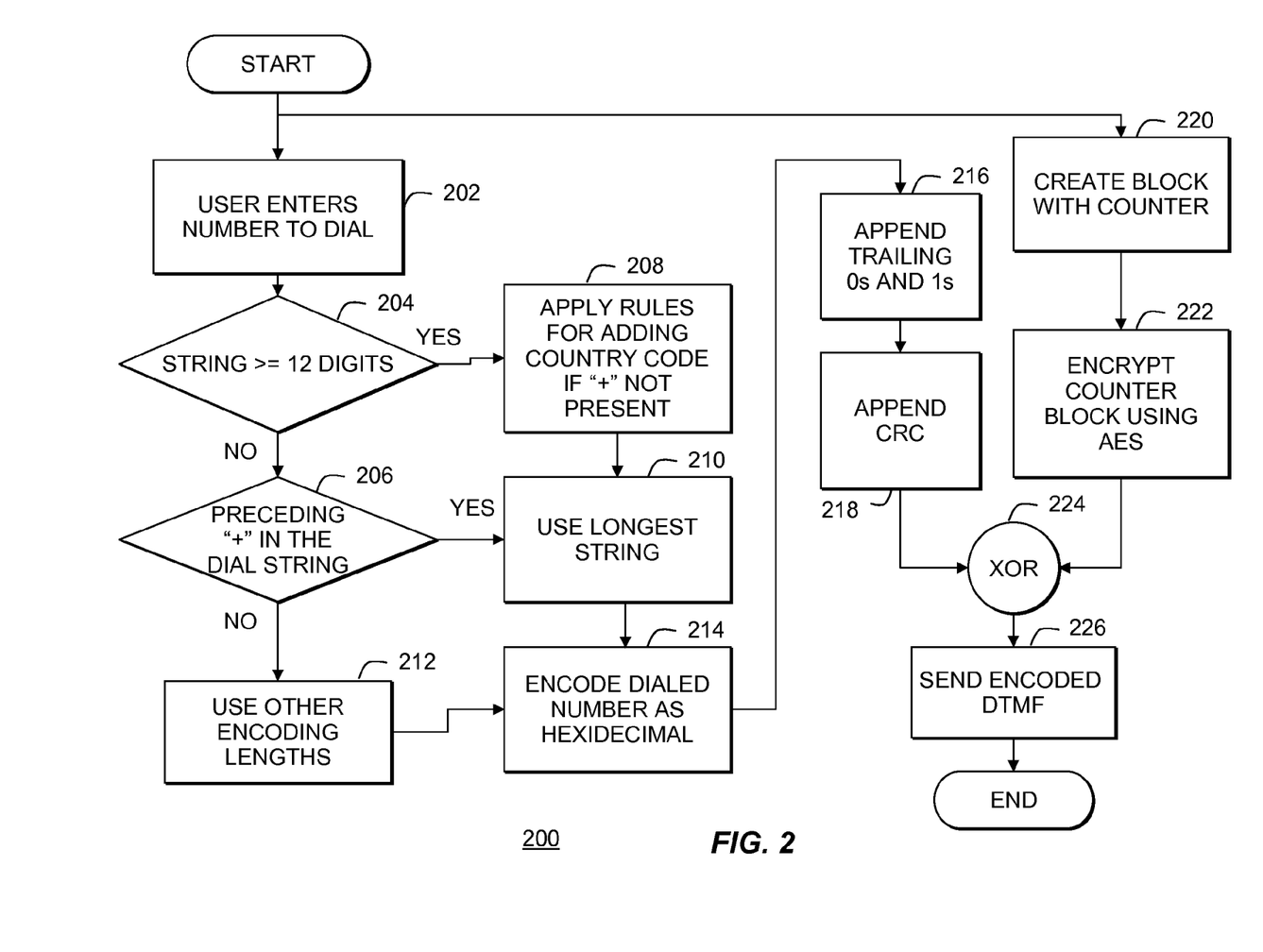
FIG. 2 is a flowchart of a method for encoding, in accordance with some embodiments of the present invention.

FIG. 2 illustrates a flowchart of a method 200 in an originating device for encoding secure call Dual-Tone Multi-Frequency (DTMF) signaling between communication networks, in accordance with the present invention.

The encoding starts when a user enters 202 a telephone number as a string of characters or digits in an originating device in an originating communication network to call a destination device in a destination communication network.

The encoding continues by determining 204 whether the dial string has a length of twelve digits or more. This indicates an international call and that a country code and "+" should be present. If these items are not present, then they should be prepended 208 to the dialing string. This can be done by prompting the user, referring to a previous call log, or by using information retrieved in the originating device. If the dial string has a length of less than twelve digits but there is a "+" sign in the dial string 206, this also indicates an international call. In either case, the present invention selects the longest predefined string length 210 (i.e. fifteen characters) for the dial string. If the dial string is less than twelve digits and there is no "+" sign in the dial string 206, this indicates a non-international call, and a smaller predefined string length (i.e. five, eight or eleven characters) can be assigned for the dial string 212, as previously described.

Once the length of the dial string is established the dial string is converted 214 to a hexadecimal in a nibble format. A form of the hexadecimal is placed into a predetermined location in the string. For example, the order of the characters in the dial string can be reversed such that any leading unused bits after hexadecimal conversion are now trailing bits of the dial string. The reversed dial string can then be placed in a leading position of the predetermined string.

In order to fill in the remaining bits that are left over in the predetermined string length when the dial string is placed therein, if any, the present invention appends the dial string with "zeros" or "ones" in predetermined locations 216. In particular, the sequence of "one" bits can be appended at the trailing end of the dial string to indicate to what extent (i.e. how many nibbles) the entered dial string is shorter than the maximum allowed in the predetermined string. For example, the sequence "1111" can be placed in the last four unused bits to indicate that there are four nibbles (sixteen) bits that are unused. The remainder of the intervening unused bits can be set to "zero" bits to provide additional testing for validity of the string. For example, if a six digit number "123456" is to be dialed, the present invention will fit this string into a predefined string length of eight digits. The present invention will convert the string "123456" into hexadecimals and reverse the order of these bits. After this, the hexadecimal string can be appended with the bits "00000011" (from Table 2).

The present invention can then further add CRC bits 218 to the string, such as at the end of the string.

At the start of encoding, the present invention will also create 128-bit blocks 220, each block incremented by a counter.

These blocks are then encrypted 222 using a seed that is shared between the originating device and the gateway.

The encrypted counter blocks are then XOR'ed 224 with the final encoded string including the predetermined string length and any added CRC bits.

The encoding ends when the originating device sends 226 the encoded (and encrypted) DTMF in a message to a gateway to the destination communication network.

Figure 3:
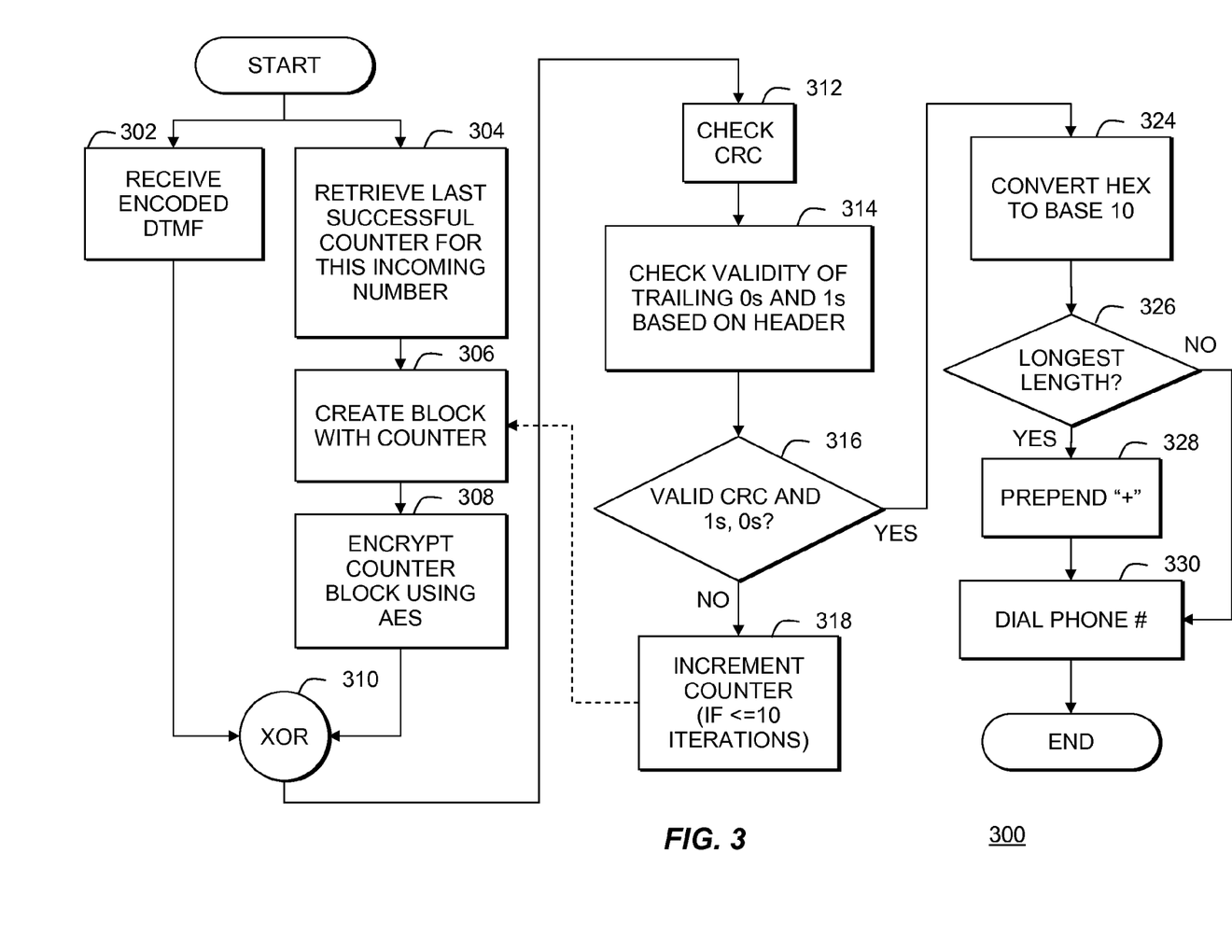
FIG. 3 is a flowchart of a method for encoding, in accordance with some embodiments of the present invention.

FIG. 3 illustrates a flowchart of a method 300 in a gateway for decoding the encoded DTMF produced by the originating device in FIG. 2, in accordance with the present invention.

Decoding starts when the gateway receives 302 the encoded DTMF string.

The gateway also retrieves 304 the last successful block counter that was used for this incoming number, and creates 306 a 128-bit block with this counter in the same way that originating device did in step 220.

The gateway encrypts the counter block in the same way and with the same seed that originating device did in step 222. By XOR'ing the received encoded DTMF string with the same encrypted counter block 310 the encoded string can be retrieved in a secure manner.

The gateway can then check 312 the received string against the CRC bits to determine if the string has been corrupted 316.

In addition, the gateway can check 314 the trailing "zeros" and "ones" of the string for validity by comparing these against the header. For example, if the header defines a length of five digits, and the string has five valid digits, then the gateway should see three trailing "zeros" and no trailing "ones" (from Table 2) in the string. If this is false 316, then the string is not valid. This invalidity may be due to a lost message from the originating device. Therefore, the gateway can attempt to find a valid string by incrementing 318 its block counter, create a new block 306 with this counter, encrypt the block 308 and repeat the procedure, wherein if a valid string can not be found in a certain number (e.g. ten) of iterations, the gateway can drop the call.

However, if the gateway validates 316 the dial string using the trailing "zeros" and "ones", then the gateway can reverse the hexadecimal nibbles and convert 324 the string back into the base ten telephone number. If the dial string is of the longest length (i.e. 15 digits), then an international call is assumed and the gateway can prepend 328 the telephone number with a "+" sign.

The gateway can then dial 330 the telephone number of the destination device, and provide an audio connection between the originating and destination devices.

Advantageously, the apparatus and method described herein provides a technique to lower the probability that an unauthorized or erroneous call can occur in a communication network.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for secure call Dual-Tone Multi-Frequency (DTMF) signaling in a system, the method comprising:
    entering a telephone number of a destination device as a dial string of characters or digits in an originating device by a user;
    assigning the dial string to a predefined string length by the originating device, wherein the predefined string has a total length that is greater than the length of the entered dial string such that there will be at least one leading hexadecimal bit in the predefined string length that is not used when the entered dial string is converted to hexadecimal;
    converting the dial string to hexadecimal by the originating device, and placing a form of the hexadecimal into a predetermined location in the string by the originating device;
    appending a number of "one" bits in predetermined locations of the predefined string with the number indicating how many nibbles of the predefined string length are unused, if any, by the originating device, and appending the remaining unused bits in the predefined string to "zero" bits by the originating device; and
    sending, by the originating device, the encoded string to a gateway for connection to the destination device.

2. The method of claim 1, wherein converting, by the originating device, the dial string to hexadecimal, and placing a form of the hexadecimal into a predetermined location in the string by the originating device is accomplished by reversing the order of the hexadecimal and placing it at the beginning of the string, and wherein the predetermined location for the "one" bits is at the end of the string, and further wherein the predetermined location of the "zero" bits is between the hexadecimal and the "one" bits' location.

3. The method of claim 1, further comprising adding Cyclic Redundancy Check bits by the originating device.

4. The method of claim 1, further comprising:
    creating blocks by the originating device, each block incremented by a counter,
    encrypting the blocks by the originating device using a seed that is shared between the originating device and the gateway, and
    XOR'ing, by the originating device, the encrypted counter blocks with the encoded string to produce an encrypted encoded string.

5. The method of claim 1, further comprising ensuring by the originating device that a country code and a "+" sign is present in the dial string if the dial string has a length greater than or equal to twelve, and using by the originating device a predetermined string length of fifteen.

6. The method of claim 1, further comprising using by the originating device a predetermined string length of fifteen if the dial string has a length of less than twelve digits and dial string has a "+" sign.

7. The method of claim 1, wherein the predetermined string has a length selected from one of the group of five, eight, eleven, and fifteen digits or characters.

8. A method for secure call Dual-Tone Multi-Frequency (DTMF) signaling in a system, the method comprising:
    receiving by a gateway an encoded DTMF string from an originating device;
    determining the length of the encoded DTMF string by the gateway;
    checking by the gateway predetermined locations in the encoded DTMF string based on the length of the encoded DTM string for "zeros" and "ones" for validity by comparing these against a header of the string;
    determining by the gateway hexadecimal nibbles of the string, and converting the hexadecimal nibbles into a telephone number by the gateway; and
    dialing by the gateway the telephone number of the destination device and providing an audio connection between the originating and destination devices by the gateway.

9. The method of claim 8, wherein if checking by the gateway determines that the string is invalid, incrementing by the gateway the block counter, creating by the gateway a new block with this incremented counter, encrypting by the gateway the block, and returning to the checking step, wherein this procedure can be repeated by the gateway a predetermined number of times to find a valid result before the gateway drops the call.

10. The method of claim 9, further comprising:
    retrieving by the gateway the last successful block counter that was used for the encoded DTMF telephone number,
    creating by the gateway a counter block with this counter,
    encrypting by the gateway the counter block with the same seed as the originating device,
    XOR'ing by the gateway the received DTMF string with the encrypted counter block, and
    using by the gateway the XOR'd value in the checking and following steps.

11. The method of claim 10, wherein if checking by the gateway determines that the received DTMF string XOR'd with the encrypted counter block is invalid, incrementing the block counter by the gateway, creating by the gateway a new block with this incremented counter, encrypting by the gateway the new block, XOR'ing by the gateway the received DTMF string with the encrypted new block, and returning to the checking step, further wherein this procedure can be repeated a predetermined number of times by the gateway to find a valid result before the gateway drops the call.

12. The method of claim 9, further comprising checking by the gateway the received string against any CRC bits.

13. The method of claim 9, wherein converting by the gateway includes determining if the string has a length of fifteen digits, and prepending the telephone number with a "+" sign by the gateway.

14. A system for secure call Dual-Tone Multi-Frequency (DTMF) signaling, the system comprising:

an originating device, wherein a user enters a telephone number of a destination device as a dial string of characters or digits, the originating device assigning the dial string to a predefined string length, wherein the predefined string length has a total length that is greater than the length of the entered dial string such that there will be at least one leading hexadecimal bit in the predefined string length that is not used when the entered dial string is converted to a hexadecimal, the originating device converting the dial string to hexadecimal, reversing the order of the hexadecimal, and placing the reversed hexadecimal at the beginning of the predefined string length, the originating device appending a number of "one" bits at the end of the predefined string length with the number indicating how many nibbles of the predefined string length are unused, if any, and appending the remaining intervening unused bits in the predefined string length to "zero" bits, wherein the originating device sends the encoded string length to a gateway for connection to the destination device.

15. The system of claim 14, wherein the originating device further adds Cyclic Redundancy Check bits at the end of the predetermined string length.

16. The system of claim 14, wherein the originating device further creates blocks, wherein each block incremented by a counter, encrypts the blocks using a seed that is shared between the originating device and the gateway, and XOR's the encrypted counter blocks with a final encoded string.

17. The system of claim 14, wherein the predetermined string length has a length selected from one of the group of five, eight, eleven, and fifteen digits or characters.

18. The system of claim 14, further comprising a gateway, wherein the gateway receives the encoded DTMF string, checks the trailing "zeros" and "ones" of the string for validity by comparing these against a header of the string, reverses the hexadecimal nibbles, and converts the string back into the base ten telephone number, wherein the gateway dials the telephone number of the destination device and provides an audio connection between the originating and destination devices.

19. The system of claim 18, wherein if the gateway determines that the string is invalid, the gateway increments the block counter, creates a new block with this incremented counter, encrypts the block, and returns to check validity, wherein this procedure can be repeated a predetermined number of times to find a valid result before the gateway drops the call.

20. The system of claim 14, wherein the gateway further retrieves the last successful block counter that was used for the encoded DTMF telephone number, creates a counter block with this counter, encrypts the counter block with the same seed as the originating device, and XOR's the received DTMF string with the encrypted counter block.

21. The system of claim 14, wherein the gateway further checks the received string against any CRC bits.

* * * * *

UNITED STATES PATENT AND TRADEMARK OFFICE
CERTIFICATE OF CORRECTION

Page 1 of 1

PATENT NO. : 8,249,242 B2
APPLICATION NO. : 12/878153
DATED : August 21, 2012
INVENTOR(S) : Lundsgaard et al.

It is certified that error appears in the above-identified patent and that said Letters Patent is hereby corrected as shown below:

In Fig. 1, Sheet 1 of 3, for Tag "106", in Line 2, delete "COMMUNINCATION" and insert -- COMMUNICATION --, therefor.

In Fig. 1, Sheet 1 of 3, for Tag "108", in Line 2, delete "COMMUNINCATION" and insert -- COMMUNICATION --, therefor.

In Column 10, Line 38, in Claim 8, delete "DTM" and insert -- DTMF --, therefor.

Signed and Sealed this
Fifth Day of February, 2013

Teresa Stanek Rea
*Acting Director of the United States Patent and Trademark Office*